United States Patent [19]

McConnell et al.

[11] 4,171,954
[45] Oct. 23, 1979

[54] REACTIVE DYEING SYSTEMS USING DYES WITH CARBOXYLIC ACID GROUPS ON POLYVINYL ALCOHOL

[75] Inventors: Bobby L. McConnell, Greensboro, N.C.; Raymond Thornton, Lake Placid, N.Y.; Louis A. Graham, Greensboro, N.C.

[73] Assignee: Burlington Industries, Inc., Greensboro, N.C.

[21] Appl. No.: 924,563

[22] Filed: Jul. 14, 1978

Related U.S. Application Data

[63] Continuation-in-part of Ser. No. 772,738, Feb. 28, 1977, Pat. No. 4,111,648, which is a continuation of Ser. No. 588,840, Jun. 20, 1975, abandoned.

[51] Int. Cl.$^2$ ............................................. C09B 65/00
[52] U.S. Cl. ............................................. 8/30; 8/1 A; 8/1 XA; 8/39 R; 8/41 R; 8/54.2; 8/85 R; 8/172 R; 8/181
[58] Field of Search ............ 8/39 R, 41 R, 181, 172 R, 8/85 R, 30, 1 A

[56] References Cited

U.S. PATENT DOCUMENTS

| | | | |
|---|---|---|---|
| 3,535,308 | 10/1970 | Schaefer et al. | 260/209.5 |
| 4,111,648 | 9/1978 | McConnell et al. | 8/30 |

FOREIGN PATENT DOCUMENTS 1087673 10/1967 United Kingdom.

OTHER PUBLICATIONS

O'Brien, S. J., Textile Research Journal, 1968, pp. 256–266.

*Primary Examiner*—A. Lionel Clingman
*Attorney, Agent, or Firm*—Cushman, Darby & Cushman

[57] ABSTRACT

Carboxy substituted aromatic chromophores are reactively linked to fibers containing alcoholic hydroxyl groups, amino groups or thiol groups, such as cellulosic fibers, with the linkage produced in the presence of a cyanamide compound, such as cyanamide or dicyandiamide.

17 Claims, No Drawings

REACTIVE DYEING SYSTEMS USING DYES WITH CARBOXYLIC ACID GROUPS ON POLYVINYL ALCOHOL

This is a continuation-in-part of application Ser. No. 772,738, filed Feb. 28, 1977 now U.S. Pat. No. 4,111,648 which in turn is a continuation of Ser. No. 588,840 filed June 20, 1975 now abandoned.

BACKGROUND OF THE INVENTION

The present invention relates to dyeing of fibers and more particularly to reactively dyed fibers in which a chromophore is chemically linked to sites on the fiber.

Dyes are retained in fibers by physical adsorption, salt or metal-complex formation, solution, entrapment, or the formation of covalent chemical bonds. Physical adsorption and solution, in which the dye is partitioned between the fiber and the surrounding aqueous phase, are equilibrium processes, and only by very careful selection of the dyes used, can good washfastness properties be achieved. Salt and metal complex formation are also equilibrium reactions and, though generally the retention of the dye is favored more than in physical adsorption, washfastness may still present a problem. The dyes that are held by entrapment (azoics, vats and sulfurs) are virtually insoluble in water and show excellent fastness to washing, but have other disadvantages. They are, for example, difficult and expensive to apply; loose dye, which is not easily washed off, may be deposited on the surface, resulting in low fastness to rubbing (crockfastness), and the final shade of the dyeing does not develop until completion of the whole dyeing cycle and aftertreatments.

Chemical bonding of dye to fiber for fixation of dye was recognized as early as 1895. The reactive dye systems presently available require that the dyes contain a functional group capable of forming a covalent chemical bond with the fiber.

Fiber-reactive dyes are employed quite widely in coloring cellulosics and proteinaceous fibers. They, of course, exhibit excellent washfastness, resistance to rubbing, tinctorial powers, ease of application and leveling. The latter quality is a measure of uniformity and most important for long dye runs and color matching. The reaction of the dye with cellulosic fibers is basically an etherification or esterification reaction and is broadly represented as:

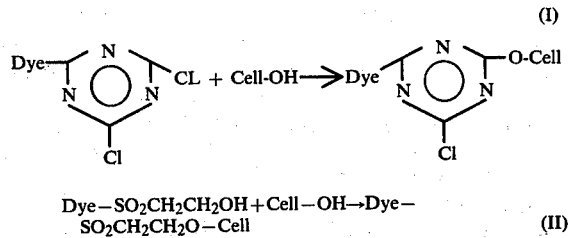

$$\text{Dye}-SO_2CH_2CH_2OH + \text{Cell}-OH \rightarrow \text{Dye}-SO_2CH_2CH_2O-\text{Cell} \quad \text{(II)}$$

Reactive dyes of Type I are labile halides, and as such they are by nature of limited stability in storage and difficult to work with. Their reactions are generally effected under alkaline conditions. There are few presently available reactive dye systems which operate well under acidic conditions. An acidic system is often desirable in the dyeing of mixed fabrics such as cotton blends with polyester, wool or nylon, the latter two fibers being dyeable by acid dyes. However, acid dyes generally have no affinity for cellulose and usually only find use in dyeing of proteinaceous fibers.

The American Cyanamid Company has published a booklet entitled "Cyanamide", which sets forth a considerable number of reactions of cyanamide and dicyandiamide. Page 32 of this booklet indicates that cyanamide was long known to be a dehydrating agent when warmed in anhydrous formic acid or when used in the esterification of lactic or salicylic acid with absolute ethanol. Note Pratorius-Seidler, G.,J. prakt. Chem [2] 21, 129–50 (1880); C. 1880, 245. A number of papers have investigated the reaction of cyanamide with carboxylic acids, and have proposed a mechanism wherein the acid is converted to the anhydride by interaction with cyanamide, with formation of urea. Subsequently the urea is acylated by the anhydride to produce a ureide, which at elevated temperatures interacts with the acid to produce an amide.

The use of cyanamide and phosphoric acid to impart flame retardant properties to cotton and other cellulosic fabrics is well known to the art. For instance, O'Brien, "Cyanamide Based Durable Flame-Retardant Finish for Cotton", Textile Research Journal, March, 1968, pp. 256–266 indicates, at page 265, that the reaction of cyanamide and phosphoric acid with cellulose results in a cross-linking of cellulose molecules. From the properties of the resulting product, it is suggested that the cross-linked cellulose is some type of dicellulose phosphate ester.

Copending, commonly assigned application Ser. No. 534,349, filed Dec. 18, 1974, to Swidler and Sanderson, discloses the use of cyanamide compounds, such as cyanamide and dicyandiamide, to aid in the reactive dyeing of substrates containing certain types of active hydrogen atoms, including cellulosic fibers, with phosphorus-containing dyes, such as dyes containing phosphonic acid groups, or salts thereof.

U.S. Pat. No. 3,535,308 discloses a process for preparing organic esters of polyhydroxylic polymers. These organic esters are indicated to have various uses, including application to textiles, as presented in more detail in, for example, Ott et al, *Cellulose and Cellulose Derivatives*, Vol. V, Part II, pp. 763–820. The polymers are prepared by contacting a polyhydroxylic polymer containing esterifiable hydroxyl groups with cyanamide or cyanamide salts and a carboxylic acid for a time sufficient to impregnate the polymer with the cyanamide and the acid. Thereafter the impregnated polymer is heated for a time sufficient to react the components to produce the partially esterified polymer. The degree of esterification is indicated to depend upon many different factors, and it is indicated that polymers containing as many as one ester grouping for every 10–30 esterifiable hydroxyl groups have been prepared.

SUMMARY OF THE INVENTION

The present invention provides a method of dyeing a polymeric substrate containing certain Zerewitinoff-active hydrogen atoms, such as non-phenolic alcoholic hydroxyl groups, thiol groups, or amino groups. The substrate is contacted with a cyanamide compound, such as cyanamide or dicyandiamide, and with a carboxy-substituted aromatic dye. The cyanamide and the dye carboxylic groups are present in a ratio of equivalents of at least about 2:1 respectively, and in a system having a pH of about 1.5 to about 11. The substrate contacted with the cyanamide compound and the dyes is heated to a temperature of at least 200° F. for a time sufficient to fix the dye on the substrate.

The resulting dyed textile substrates exhibit reasonably good fixation, especially when the carboxyl group is attached to the dye through the carbon atom of a phenyl ring, with the phenyl ring carrying an amino group on a carbon atom adjacent to that attached to the carboxyl group, such as in derivatives of anthranilic acid.

DETAILED DESCRIPTION OF THE INVENTION

The present invention provides a method of dyeing certain polymeric substrates containing certain types of active hydrogen atoms, wherein the substrate can be reactively dyed in acidic to mildly alkaline solutions. It is believed that the dye system of the present invention results in reactively dyed substrates by chemically linking the dye to the substrate through a carboxylic ester linkage, but this theory has not been finally confirmed. Following this theory, it appears that the ester is formed by the following reaction:

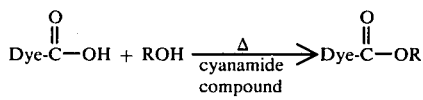

wherein ROH is, for instance, a cellulosic polymer, and Dye is a chromophore carrying the auxochromic carboxy group.

The cyanamide compound appears to function as a condensation agent for the reaction. The dye can be directly reacted with the substrate, or alternatively certain dyes can be formed in situ. For instance, since most azo dyes are produced by a simple coupling of the two dye intermediates, the first intermediate, such as p-aminobenzoic acid, may be reacted with the substrate by the method of the invention, after which the thus derivatized substrate is diazotized and coupled with the second intermediate to produce the color.

The dye may be reacted with the entire substrate, either by direct application or by in situ formation as above, or it may be applied in patterns by any of several conventional printing techniques, using either the direct or the in situ approach. For example, p-aminobenzoic acid may be printed onto the substrate and reacted, diazotized, and coupled as above. Unused coupling intermediate on the background areas may afterwards be scoured away. As will be clear, the first intermediate may be reacted overall with the substrate and the coupling intermediate applied by printing, but this approach is generally less preferred.

In the dye system of the present invention, a single group, the carboxyl group, serves both as an aqueous solubilizing group and as the potential fiber reacting coupling site. The present reactive dyes can be synthesized easily, and in most instances they are less complex than heretofore available reactive dyes. The dyes and their dyed products, both show superior resistance to water and other destructive agents.

The substrate contains reactive alcoholic groups, thiol groups, and/or amino groups. The substrates containing non-phenolic alcoholic groups are particularly preferred, especially cellulosic substrates. The reactive dyes may be applied to substrates containing alcoholic hydroxyl groups, especially cotton, and may be used to dye fibers, films, yarns, cords, threads, paper, non-woven fabrics, woven fabrics, knitted fabrics, pile fabrics, velvets, carded webs and webs formed on a random webber. The reactive sites on the substrate will have the formula —OH; —NH$_2$ (amino) or —SH. The process of the present invention results in the fixation of reactive dyestuffs on rayon and fixation may be obtained on wool, but the depth of shade is not as good as with rayon. Fixation is also obtained on nylon but the depth of shade is somewhat inferior to that of wool. While the substrate may be in the form of cast or other massive articles, it is greatly preferred that the substrate be a textile fabric or a textile yarn, filament or fiber, and most especially of an organic polymer containing alcoholic groups.

The cyanamide compound will be of the general formula

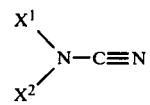

wherein $X^1$ and $X^2$ are hydrogen, lower alkyl, or together are

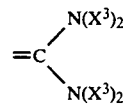

wherein each $X^3$ is independently hydrogen or lower alkyl. Thus, methylcyanamide, dimethylcyanamide, ethylcyanamide, diethylcyanamide, butylcyanamide, dibutylcyanamide, and other cyanamide compounds falling within the scope of the above formula disclosed in the foresaid American Cyanamid Company "Cyanamide" booklet, the disclosure of which is hereby incorporated by reference, may be used in place of cyanamide or dicyandiamide. However, cyanamide and dicyandiamide are particularly preferred, due to their lower cost and ready availability. Compounds of the above general formula may exist in tautomeric form and these tautomers are intended to be included in the general formula.

The dyes that can be utilized in the process of the present invention can be of diverse type and structure, including anthraquinone, phthalocyanine, azo, benzanthrone, pyrazolone, naphthoquinone, triarylmethane and cyanine. The dye must contain at least one carboxyl group, or salt thereof, to impart water solubility and to provide a reactive site to attach to the reactive hydrogen atoms on the substrate. The dye may contain other aqueous solubilizing groups, such as sulphonate groups, and may contain other substituents, as long as such other substituents do not interfere with the aqueous solubility characteristics or with the dye fixation reaction.

It is most preferred that the carboxyl group be directly attached to a ring carbon atom of an aromatic ring of the dye. In a particularly preferred embodiment, wherein especially good levels of fixation have been obtained, the carboxyl group is directly attached to such a ring carbon atom, and the next adjoining ring carbon atom carries an amino (—NH$_2$) group. Thus, the dye will be of the general formula

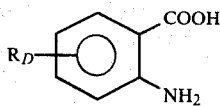

where $R_D$ is the remaining part of a dye and is attached to one position of the aminocarboxyphenyl ring. Clearly the dye may contain one or more, generally one or two, aminocarboxyphenyl rings.

Certain aminocarboxy ring-substituted anthraquinone dye intermediates are known (see, e.g., *Colour Index*, Vol. 4, pages 4722-3) for the production of dyes.

Another aspect of the present invention resides in the provision of a dyebath containing a tinctorial amount of, as one of the essential components therein, a dye of the general formula

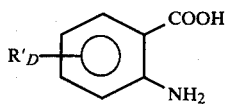

where $R'_D$ is the remaining part of the dye and is attached through a single or, as in naphthalene or anthraquinone derivatives, two adjacent ring positions of the aminocarboxyphenyl ring.

Alternatively, the carboxyl group may be attached to a ring carbon atom of an aromatic group in the dye by way of an alkylene bridging group containing 1-3 carbon atoms, or an oxyalkylene bridging group containing 1-3 carbon atoms, as illustrated in Example 11 hereinafter. Furthermore, the carboxyl group may be attached to a carbon atom of an aromatic group in the dye through a group of the formula:

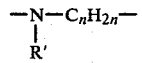

wherein R' is hydrogen, alkyl of 1-3 carbon atoms, or another $-C_nH_{2n}COOH$ group, and n is 1 to 3.

It will be readily appreciated by those in the art that salts, especially alkali metal salts and ammonium salts of the carboxylic acid radical, may be readily utilized.

The reactive dyeing process of the present invention involves the formation of an aqueous solution or partial suspension (wherein the dye is not wholly dissolved) of a dye, or a dye precursor, containing at least one chemically linked carboxyl group. The aqueous solution or partial suspension will contain that amount of dye necessary to produce on the substrate a commercially acceptable coloration, and the solution or partial suspension will generally contain at least 0.1 weight percent of the dye, and generally no more than 10 weight percent of the dye, depending upon the desired depth of said shade and the intensity of the dye. The dye concentration in the aqueous solution will more commonly be between 0.05 and 5% by weight, and the concentration of reacted dye on the fabric is believed to be generally in the range of 0.01 to about 0.5 weight percent, although much greater concentrations of dye on the fabric can be used, even up to 5.0 weight percent or more if desired. It will be appreciated by those in the art, however, that the above ranges are not always used, as the values in question may vary according to the desired depth of shade, the strength or intensity of the dye, and similar factors.

The pH of the aqueous system is preferably controlled within the range of about 4-6, but can vary from about 1.5 to about 11.0. Lower values of pH can be provided by the addition to the aqueous solution of 0.05-5 weight percent of an acid which preferably will not volatilize at the cure temperature, and which does not cause undue degradation of the substrate, such as, for instance, phosphoric acid, lower alkyl phosphonic acid and chloroacetic acid. In some instances, the addition of the acid appears to improve the efficiency of the dye immobilization, as greater fixation will be noted after the curing step. Normally, the amount of cyanamide compound in the aqueous solution will be increased if the acid addition is used. Higher pH baths which may be utilized generally contain salts which are converted to the acid form during cure, such as ammonium salts of the carboxylic acid. Such higher pH dye baths may be necessary in situations which may present corrosion problems, or when using mixed fiber systems or fibers which would be adversely degraded at low pH.

In the dye bath the ratio of equivalents of cyanamide compound to carboxyl acid function of the aromatic dye is at least about 2:1. While greater excesses of the cyanamide compound may be used, such as an equivalents ratio of up to 100:1, generally no benefit will accrue therefrom. Normally, the ratio of equivalents of cyanamide compound to carboxylic acid function will be in the range of about 2:1 to 15:1.

The curing of the reactive dye system is generally conducted at temperatures of at least 200° F. and normally below 450° F. The fabric may optionally be preliminarily dried before the curing step. The cure time may vary from the order of seconds to hours, depending upon the cure temperature, the dye concentration and the substrate.

As mentioned previously, the cyanamide compound appears to function as a water soluble condensation agent which assists in the formation of an ester linkage between the dye and the substrate. The cyanamide compound is preferably cyanamide or dicyandiamide.

The dyebath may also contain minor amounts of conventional additives and dye assistants, including stabilizers, antimigrating agents, wetting agents, thickening agents and the like.

It will be readily appreciated that dyes containing carboxylic acid substituents that are known to the art may be used in the practice of the present invention. Some of these known dyes are direct dyes, and some are mordant dyes. Suitable dyes are disclosed in the *Colour Index* 3rd Edition, The Society of Dyers and Colourists, Bradford, Yorkshire, England, 1971 (and especially volume 4 thereof), the disclosure of which is hereby incorporated by reference.

A new group of dyes, exemplified by Example 5 hereinafter, constitutes derivatives of mono or dichlorotriazinylamino dyes wherein all of the labile chlorine atoms on the triazine ring have been replaced, by conventional means well known in the art, by non-labile groups, at least one of which contains a carboxylic acid group.

The wide range of variations in chromophores and the partial substitution of halide groups in conventional reactive triazine dyes is discussed in detail in W. F. Beech, *Fibre-Reactive Dyes,* Logos Press, Ltd., London, 1970, pages 114-131, the disclosure of which is hereby incorporated by reference. The idea of the present invention is the application of the known techniques of partial replacement of the reactive halides to their total replacement, thereby eliminating the storage stability and other problems inherent in chlorotriazine dyes while retaining their capacity for covalent bonding with cellulose.

This group of the new modified dyes of the invention have the general formula:

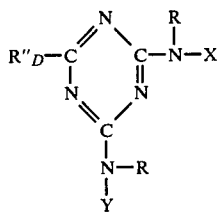

wherein $R_D''$ is the remaining part of a dye, the linkage of which to the triazine ring is preferably through an

group, wherein R" is H or CH$_3$, R is H or CH$_3$, X is ArCOOH wherein Ar is phenyl or naphthyl, which may be further ring-substituted by lower alkyl of 1 to 4 carbon atoms, Cl, Br, NO$_2$, SO$_3$H, and COOH, Y is X, H, CH$_3$, or phenyl, which may be substituted by lower alkyl of 1 to 4 carbon atoms, Cl, Br, NO$_2$, and SO$_3$H.

It is obvious that when Y is an inert group, the resulting dye, unless there be carboxylic groups within the chromophore, performs as a monobasic carboxylic acid in the process of the present invention. Where Y is a second X group, the dye exhibits the bonding performance and other advantages of a dye with two reactive carboxylic acid groups.

Carboxylic group reactivity may be enhanced not only by the presence of one or two arylcarboxylic groups on the triazine ring as shown in the foregoing formula, but also by the presence of carboxylic groups in the chromophore.

One familiar with the technology of reactive dyes will readily realize that the concept here presented is adaptable not only to triazine reactive dyes, but to related cyclic dyes derived from pyridazines, pyridazones, pyrimidines, and the like.

The modified triazine and the like dyes may be conveniently made from commercially available reactive dyes by replacement of their active halogens. It is obvious, however, that they may also be made by alternative routes, not necessarily passing through the conventional dyes, from intermediates normally used in making the conventional chlorotriazine and the like dyes.

The process of the present invention may be conducted in commercially available machinery used for dyeing textiles or printing textiles, including both continuous and non-continuous process apparatus. The substrate, especially when in the form of fabric or sheet material, may be impregnated with the dye solution and then subjected to curing by heating in the indicated temperature range in, for example, a hot flue dryer, an oven or a stenter. The substrate impregnation may be conducted by padding the substrate with an aqueous solution containing the dye and the cyanamide compound. The process of the present invention may also be conducted by conventional textile printing methods, for instance, by locally printing a textile substrate with a solution containing the dye and the cyanamide compound, and thereafter subjecting the printed substrate to an elevated curing temperature. Also, a carboxylic acid-substituted dye precursor may be reacted with the substrate by the process of the present invention, and thereafter coupled through an azo linkage to the other half of an azo dye.

The present invention provides a novel acid system for the fast dyeing of fibers containing alcoholic hydroxyl, thiol or amino groups, with the reactively dyed fibers exhibiting good color and stability to hot basic media.

The dye, the substrate, and the cyanamide compound may be brought together in any particular order, although as indicated hereinabove, the dye and the cyanamide compound together with any desired conventional additives or assistants will normally be in the form of an aqueous solution or partial suspension, which is padded or otherwise applied to the substrate. At least a coloring amount of the dye will be reacted with the substrate.

Mixtures of types of substrates, mixtures of dyes and/or mixtures of cyanamide compounds may be used if desired.

A number of modifications of the present process can be utilized. As discussed previously, the dye may be formed on the substrate in situ, by reacting a carboxyl-substituted compound with the substrate and thereafter coupling the resulting compound to form an azo dye, or other chromophore. Alternatively, the aromatic dye containing at least one carboxylic acid substituent can be applied to a textile fabric by conventional methods, and then the so-treated textile fabric may be subjected to an after-treatment with the cyanamide compound.

In some instances, dyes containing two carboxylic acid groups will be found to exhibit greater efficiency of fixation, when used in the process of the present invention, and affixed to cotton or other suitable substrate.

The process of the present invention equals or excels other dyeing systems now in use for the continuous dyeing of cotton. The present process conveniently utilizes a pad, pre-dry, bake, rinse, dry system which can be conducted on existing plant equipment. Most reactive dyeing systems are based on using an alkaline dye environment, whereas the process of the present invention operates extremely well on the acid side with a pH of, for example, about 5, and thus is more compatible with the disperse dyes used in the thermosol dyeing of polyester/cotton fabrics. Dye migration problems can be controlled by normal adjustments in the padding and pre-drying steps, and such adjustments are quite easily made on polyester/cotton fabrics. The dyes produced by the present process are quite consistently level. The strength loss of the cotton fabric is generally under 5%, which is about normal for reactive dyeing processes. Color loss resistance is excellent, with the results from 10–25 washes looking very favorable. The light fastness of the dyed fabrics of the present invention is at least competitive with other reactive dyes based on similar chromophores, as is also true of other characteristics, such as resistance to dry cleaning.

Another major advantage of the dye system of the present invention is that the dyes are not subject to hydrolysis during storage, in distinct contrast to the reactive dyes which are now on the market, which have a restricted shelf life. The dyes of the present invention should last indefinitely under storage conditions, and this is basically because they are stable to moisture attack, as compared to the commercially available reactive dyes.

In other words, the dyes of the present invention are, in their original unreacted state, chemically unaffected by moisture or water. Thus, they will last with full efficiency for years, which is in distinct contrast to reactive dyes designed for alkaline-side dyeings.

Another advantage of some of the dye systems of the present invention is the level of fixation of the dye on the fiber which can be obtained.

A preferred class of carboxy-substituted aromatic dyes are of the formula

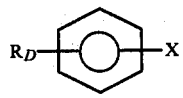

A wherein X is —COOH, —$C_nH_{2n}$COOH, O$C_nH_{2n}$COOH or

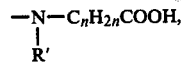

R' is hydrogen, alkyl of 1 to 6 carbon atoms, or —$C_nH_{2n}$COOH, n is 1 to 3, and $R_D$ is the remaining part of a dye and may be singly or doubly (as in a naphthalene derivative) attached to phenyl ring A, which may contain other substituents, such as amino, alkyl, hydroxyl, alkoxy, and the like.

EXAMPLES OF THE INVENTION

EXAMPLE 1

200 ml of an aqueous solution containing the following ingredients:

2 gm. CI Mordant Yellow 8 (CI 18821) of the formula

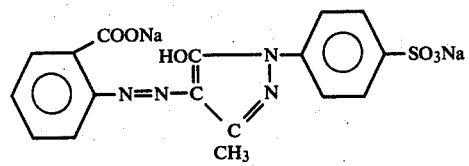

16 gm. cyanamide (50% aqueous solution)
6 gm. H$_3$PO$_4$ (85% aqueous solution)
0.5 gm. Igepal CO-710 (nonylphenoxypolyethyleneoxy)ethanol surfactant was prepared and padded on 100% cotton fabric at a pad pressure of 15 psi. The padded fabric was dried at 220° F. for 2 minutes, and then cured at 390° F. for 45 seconds.

Rinsing the dyed fabric in hot water containing a small amount of nonionic detergent produced only slight washdown.

EXAMPLE 2

A 600 ml exhaust dyebath containing 1.0% owf (0.2 g.) of Direct Orange 73 (CI 25200) of the formula:

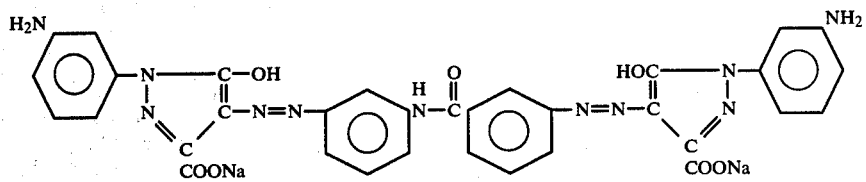

and 0.6 ml of Calsolene Oil, a sulfated ester wetting and penetrating agent sold by ICI America, Inc., was heated to 120° F. 20 grams of 100% cotton fabric was added, and the temperature was slowly raised to 200° F. Sodium chloride (10 g) was added in portions over a period of one hour, while maintaining the bath at 200° F. The bath was then dropped and the fabric was given a cold water rinse, followed by a cold rinse with 5 grams of salt in 600 ml water.

The fabric, after drying, was post-treated with an aqueous solution containing 3 volume % phosphoric acid (85% aqueous solution), 8 volume % cyanamide (50% aqueous solution), 0.5% Igepal CO-710 surfactant, and 3.0 volume % glycol diacetate. The post-treatment solution was applied by padding at 10 psi, and then the padded fabric was dried at 220° F. for one minute and cured at 390° F. for one minute. Samples of the post-treated fabric, and samples of the dyed fabrics which had not been subjected to the post-treatment, were subjected to 10 home launderings. After 10 machine washes, the ratings on the standard gray scale for the untreated fabric was 2.5 and for the treated fabric was 4.5.

EXAMPLE 3

Two aqueous solutions were prepared, containing the following ingredients:

A. 8 wt. % cyanamide (50% aqueous solution) 3 wt. % (NH$_4$)$_2$SO$_4$
B. 3 wt. % 3-methyl-6-nitrobenzoic acid 3 wt. % Diethylene glycol diacetate Solution A was padded on 100% cotton at a pad pressure of 20 psi, and the padded fabric was dried at 200° F. for one minute. Solution B was then padded on the fabric, over solution A, at a pad pressure of 20 psi, subjected to a similar drying step, and then cured at 380° F. for one minute. The nitro group was then reduced to the amine by heating for 10 minutes at 160° F. in an aqueous solution containing 3 grams per liter of 50% NaOH and 3 grams per liter sodium hydrosulfite. The amine was then diazotized by treating the fabric in a bath containing 3 g/liter of sodium nitrite and 3 g/l conc. HCl at a temperature of 35°–40° F. for 40 minutes and thereafter coupled with β-naphthol by removing the fabric from the diazotizing solution and immersing it in a solution of 1 g/l β-naphthol dissolved with 1 g/l 50% NaOH and 2 ml of methanol, at a temperature of 35°–40° F. The fabric exhibited an orange color, which had reasonably good color retention.

EXAMPLE 4

An aqueous bath containing 0.5% C.I. Direct Brown 154 (CI 30120) of the formula:

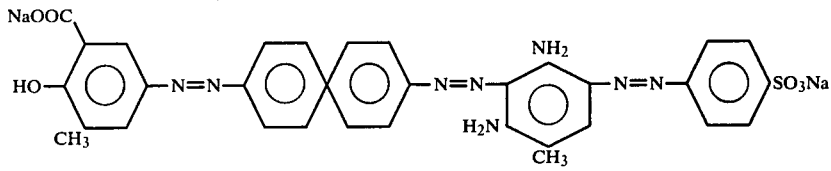

was padded onto a 100% cotton fabric, and the padded fabric was steamed for 45 seconds. The steamed fabric was then post-treated with an aqueous bath containing the following ingredients:
3 wt. % $H_3PO_4$ (85%)
8 wt. % cyanamide (50%)
0.5 wt. % Igepal CO-710

A post-treatment bath was applied by padding onto the fabric at a pad pressure of 15 psi. The padded fabric was dried at 200° F. for one minute and cured at 240° F. for one minute. Retention of the color during washing was good.

EXAMPLE 5

The dye of the formula

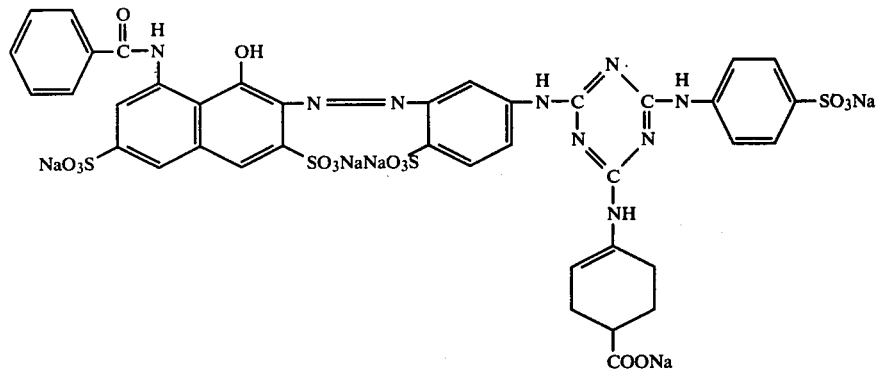

was prepared by reacting CI Reactive Red 4 (CI18105) with p-aminobenzoic acid. 5 g. commercial Reactive Red 4 (approximately 50% active dye) was dissolved in 100 ml. water. A solution of 1 g. p-aminobenzoic acid and 0.2 g. NaOH in 50 ml. water was then stirred into the dye solution. The pH was adjusted to 6.8 with HCl and the mixture warmed at 100°-120° F. for 12-14 hours. The volume was then adjusted to 150 ml. to give an approximately 2 percent concentration of the desired dye.

An aqueous dyebath was prepared containing 1% of the dye, together with the following ingredients (based on volume):
3% $H_3PO_4$ (85% aqueous solution)
8% cyanamide (50% aqueous solution)
0.25% Igepal CO-710

The above solution was padded onto 100% cotton at 15 psi, dried at 220° F. for one minute and cured at 300° F. for two minutes. Rinsing in hot water containing a small amount of nonionic detergent removed only a small amount of the dye.

EXAMPLE 6

200 ml of an aqueous solution containing the following ingredients:
2 g. 3,5-diaminobenzoic acid
0.5 g. $H_3PO_4$ (85% aqueous solution)
16 g. cyanamide (50% aqueous solution)
1 g. Igepal CO-710 was prepared and padded onto 100% cotton fabric at a pad pressure of 15 psi. Two samples were each dried at 220° F. for two minutes, and one of the samples was then cured at 390° F. for one minute. Each sample was then thoroughly rinsed to remove any unreacted diaminobenzoic acid and dried at 220° F. for one minute. The diaminobenzoic acid moiety on the fabrics was then diazotized and thereafter coupled with β-naphthol, as in Example 3. An organe color developed on the cured sample, which color could not be extracted when treated with hot dimethylacetamide (270° F.) for 2 minutes. The sample which was not cured did not develop any color when diazotized and coupled with β-naphthol.

EXAMPLE 7

An aqueous dye solution was prepared from the following ingredients:
0.5 wt. % Rhodamine B (CI Basic Violet 10, CI 45170) of the formula:

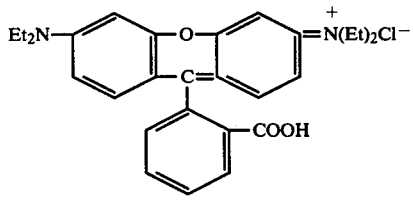

3% by volume 85% $H_3PO_4$
10% by weight Urea
8% by volume cyanamide (50% aqueous solution)

This solution was then padded on 100% cotton fabric at a pad pressure of 15 psi, dried for 2 minutes at 200° F. and then cured for 45 seconds at 390° F. A swatch of the treated fabric was rinsed in hot water containing a small amount of nonionic detergent, and very little wash-off occurred.

EXAMPLE 8

CI Direct Brown 154 (CI 30120) was exhausted onto 100% cotton fabric by the method of Example 2. The dyed fabric was then aftertreated with a bath containing the following ingredients (based on volume):
- 3% H₃PO₄ (85% aqueous solution)
- 8% cyanamide (50% aqueous solution)
- 3% glycol diacetate
- 0.25% Igepal CO-710

The aftertreatment bath was applied by padding at a pad pressure of 15 psi. Two fabric samples were padded and then dried at 220° F. for one minute, and one of the samples was then cured at 390° F. for 45 seconds. Both the dried-only sample and the cured sample, together with a control (dyed but not aftertreated) were then washed 10 times. The control had a 2 rating on the gray scale whereas both treated samples had ratings of 3.5. The results indicate that further curing after drying was not necessary with this dye.

EXAMPLE 9

Example 8 was repeated, except the dye was CI Direct Yellow 44 (CI 29000) of the average formula:

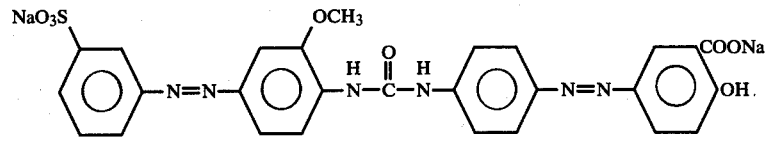

After 10 machine washings, the rating of the control on the gray scale was 3, while the treated, cured sample rated 4.5.

EXAMPLE 10

Example 8 was repeated, except the dyestuff was CI Direct Green 26 (CI 34045) of the formula:

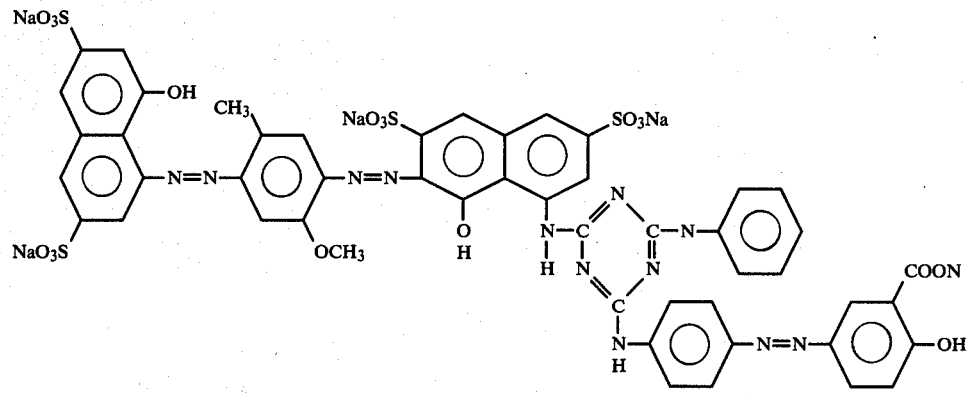

A satisfactory dyeing resulted.

EXAMPLE 11

Example 8 was repeated, except the dye was CI Direct Blue 158 (CI 24555) of the formula:

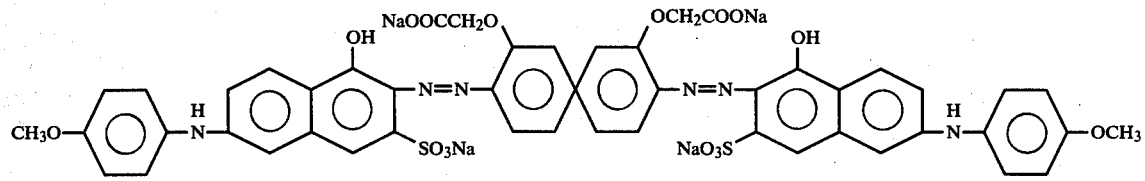

After 10 machine washings, the ratings on the gray scale for the control was 3.0, whereas the treated sample rated 4.0.

EXAMPLE 12

Example 6 was repeated, except the phosphoric acid was replaced by an equivalent amount of concentrated hydrochloric acid. The results obtained were similar.

EXAMPLE 13

0.5 grams of CI Direct Green 26 (CI 34045) was dissolved in 100 ml of water. Then 1 gram of Igepal CO-710, 1 gram of H₃PO₄ (85% aqueous solution) and 16 grams of cyanamide (50% aqueous solution) were added to the dye solution. The resulting solution was then brought to a total volume of 200 ml by the addition of water, and the pH adjusted to 7 with ammonium hydroxide. The resulting solution was padded onto 100% cotton fabric at a pad pressure of 15 psi, dried 2 minutes at 220° F., and cured 45 seconds at 390° F. The padded swatch was then rinsed in hot and in warm water containing a small amount of nonionic detergent to remove any unfixed dye. Only a very small amount of color washed off.

EXAMPLE 14

Example 13 was repeated, replacing the dye with a red dye of the structure:

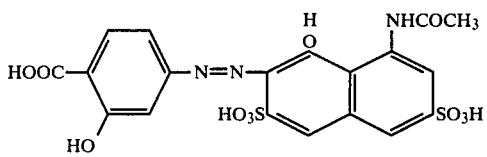

This dye, and others hereinafter, were made from the appropriate amines and coupling agents by the conventional diazotization and coupling procedures detailed in Fierz-David and Blangey, *Fundamental Processes of Dye Chemistry*, Interscience Publishers, 1949, pp. 239–59. On rinsing the sample, greater than 85% of the dye was retained on the fabric.

The synthesis of this dye was as follows:

7.1 g (0.05 mole) 2-hydroxy-4-aminobenzoic acid was dispersed in water and to this was added 25 ml cold hydrochloric acid solution (37%) while stirring to form a fine dispersion. To this solution was added 3.7 g. NaNO$_2$ (0.05 mole) dissolved in 20 ml water. The solution was stirred for 30–45 min. for complete diazotization to occur.

The solution containing the diazonium salt was added to a solution containing 16.8 g. (0.05 mole) of N-acetyl "H" acid and 15 g. 50% NaOH in 100 ml water at 5° C. The solution was maintained at a temperature of 5° C. while stirring for 30–45 min. A bright red color was formed. The red dye was salted out, filtered and purified. The dye was then ion exchanged to form the free acid.

EXAMPLE 15

Example 13 was repeated, but the dye was replaced with the red dye of the formula:

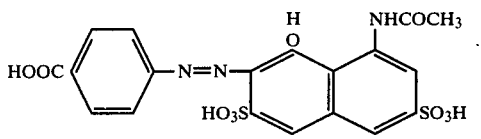

The dye was made by the following procedure: 6.8 g. (0.05 mole) p-aminobenzoic acid was dispersed in 75 ml water and neutralized with 10.6 g (0.1 mole) sodium carbonate and cooled to 15°–20° C. 3.7 g. NaNO$_2$ (0.05 mole) dissolved in 20 ml water was added to the neutralized acid. The above mixture was poured carefully into a mixture of 25 ml conc. HCl (37%) and 50 g. of ice with stirring. The resultant mixture was stirred for 20–30 min. at a temperature of 5°–10° C. 4 g. of sulfamic acid was added to destroy excess nitrite.

The diazonium solution was added to a solution containing 16.75 g. (0.05 mole) N-acetyl "H" acid and 10 g. sodium acetate and coupling and dye isolation were accomplished as in Example 14. Upon rinsing of the dyed swatch, approximately 50% of the dye was retained.

EXAMPLE 16

The salted-out dye of Example 15 was converted to the ammonium salt, by passing an aqueous solution of the dye through an ion exchange column with the exchange resin in the ammonium form. The resulting dye was then used to replace the dye of Example 13, the procedure of which was repeated. When the resulting dyed fabric was rinsed, greater than 70% of the dye was retained on the fabric.

EXAMPLE 17

Example 13 was repeated, except the dye was replaced by the yellow dye of the formula:

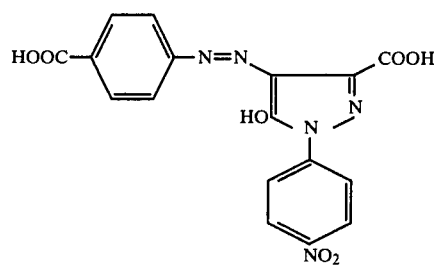

The dye was made by dispersing 3.2 g (0.025 mole) p-aminobenzoic acid in 35 ml water and neutralizing with 5.3 g. (0.05 mole) Na$_2$CO$_3$ and cooling to 15°–20° C. To this was added 1.9 g. (0.025 mole) NaNO$_2$ dissolved in 10 ml. water. The solution was added to a mixture containing 15 ml. conc. HCl (37%) in 25 g. ice. The resultant solution was stirred for 20–30 min. at 5° C.

The diazonium solution was added slowly to a solution containing 7.1 g. (0.025 mole) 1-(4'-nitrophenyl)-3-carboxy-5-pyrazolone and 15 g. Na$_2$CO$_3$ with stirring while maintaining the temperature at about 5° C. The mixture was stirred for 30–45 min. more and the yellow dye was precipitated with 10 ml. conc. HCl, filtered and dried. When the dyed swatch was rinsed, approximately 50% of the dye was retained on the fabric.

EXAMPLE 18

Example 13 was repeated, but replacing the dye with the red dye of the formula:

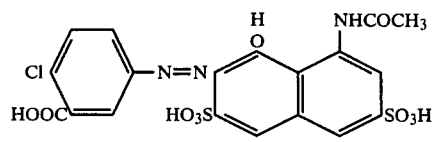

The dye was made by the procedure of Example 15, but with the p-aminobenzoic acid replaced with 0.05 mole 2-chloro-5-aminobenzoic acid. Approximately 30% of the dye was retained following rinsing of the dyed sample.

EXAMPLE 19

Example 13 was repeated, replacing the Direct Green 26 with CI Direct Orange 8 (CI 22130) of the formula:

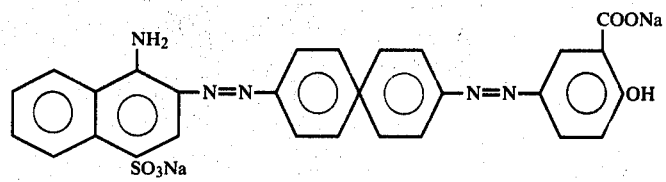

Very little washoff occurred on rinsing the dyed fabric.

EXAMPLE 20

Example 13 was repeated, but replacing the Direct Green 26 with CI Direct Yellow 44 (CI 29000) of the average formula:

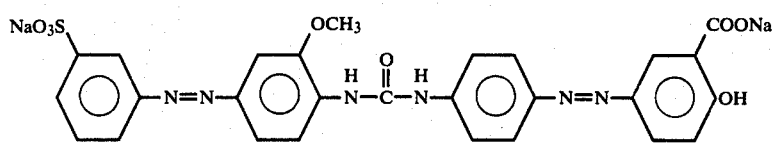

Little or no washoff occurred in the rinsing of the dyed fabric.

EXAMPLE 21

Example 13 was repeated, but using the reddish-brown dye of the formula:

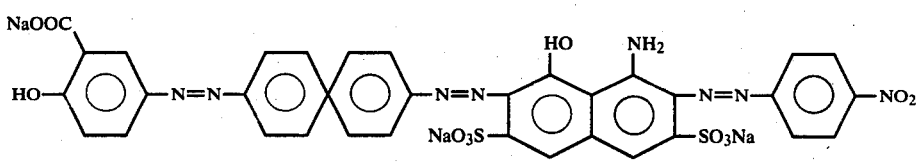

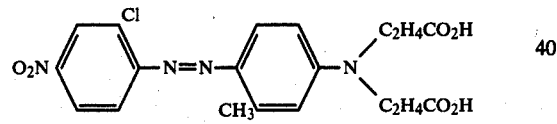

in place of the Direct Green 26. The dye was made by the procedure of Example 14, but with 8.1 g. (0.05 mole) 2-chloro-4-nitroaniline as the diazotized amine and 12.6 g. (0.05 mole) m-toluidine-N,N-dipropionic acid as the coupling agent. Approximately 30% of the dye was retained on the fabric following rinsing of the dyed fabric.

EXAMPLE 22

Example 14 was repeated, except the solution was padded onto a multifiber fabric instead of a cotton fabric. Fixation occurred on cotton, rayon, nylon and silk.

EXAMPLE 23

An aqueous dye bath was prepared, containing the following ingredients:

0.25 wt. % of CI Mordant Yellow 14 (CI 14055) of the structure:

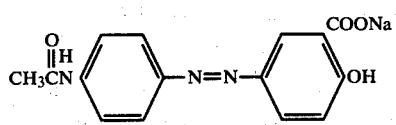

0.5 wt. % H$_3$PO$_4$ (85% aqueous solution)
2.0 wt. % dicyandiamide
0.5 wt. % Igepal CO-710

The above dye bath was mixed and padded onto 100% cotton fabric, and the treated fabric was dried at 220° F. and cured for 45 seconds at 390° F. The sample was rinsed and dried, and some fixation was found to have occurred, though inferior to the same treatment with cyanamide in place of the dicyandiamide.

EXAMPLE 24

Example 13 was repeated, except the Direct Green 26 was replaced by CI Direct Green 8 (CI 30315) having the structure:

Somewhat similar results were obtained.

EXAMPLE 25

Example 1 was repeated, except the Mordant Yellow 8 was replaced by Mordant Yellow 14, having the structure:

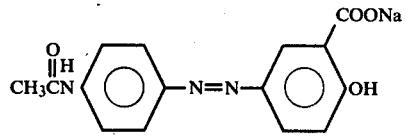

Similar results were obtained to Example 1.

EXAMPLE 26

Example 1 was repeated, except the Mordant Yellow 8 was replaced by CI Mordant Green 13 (CI 42005), having the structure:

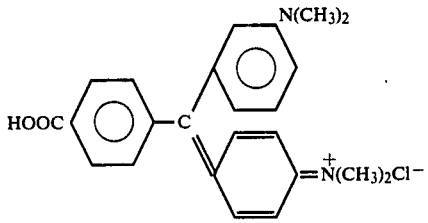

Somewhat similar results were obtained, as compared to Example 1.

EXAMPLE 27

Example 1 was repeated, except the Mordant Yellow 8 dye was replaced by CI Mordant Green 23 (CI 42010), having the structure:

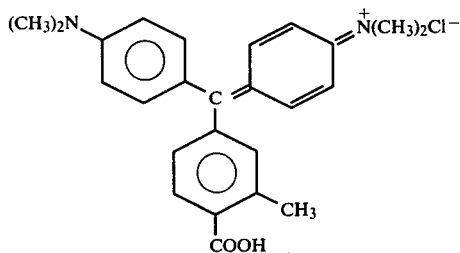

Results obtained were similar to those of Example 1.

EXAMPLE 28

Example 1 was repeated, except that Mordant Yellow 8 dye was replaced by CI Mordant Blue 52 (CI 42015), having the structure

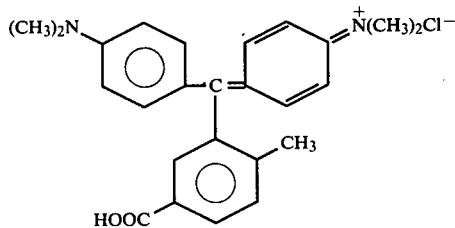

Results obtained were similar to those of Example 1.

EXAMPLES 29–36

These examples relate to the use of the following compounds:
p-aminobenzoic acid
4-nitrophthalic acid
3,5-diaminobenzoic acid
o-nitrophenylpyruvic acid
3-nitro-1,9-naphthalic acid
o-aminobenzoic acid
4-nitro-2-aminobenzoic acid
p-hydroxybenzoic acid The compounds were diazotized and coupled after fixation on the cloth in order to form the chromophores in situ.

Each of the above compounds was mixed into an aqueous solution containing 8 volume % cyanamide (50% aqueous solution), 0.5 volume % of 85% phosphoric acid, and 1.0 wt. % of the compound. The aqueous solution was then padded onto 100% cotton fabric, at a pickup of about 70–80%, dried and then cured for 45 seconds at 340° F. Where necessary, the pH was adjusted by the addition of ammonium hydroxide in order to render the compounds soluble in the aqueous solution.

For those compounds having a nitro rather than an amino group, the nitro group was reduced to an amine by the procedure of Example 3. The compounds were then diazotized and coupled with either $\beta$-naphthol or 4-amino-1-naphthalene sulfonic acid, as in Example 3, in order to form the dye.

The cloth treated with p-aminobenzoic acid was given 5 and 10 machine washings prior to and subsequent to coupling with $\beta$-naphthol, and the endurance in both cases was in the order of 80–90%.

For comparative purposes, p-aminobenzoic acid was compared with m-aminobenzenephosphonic acid in reactions on cotton, using cyanamide as the condensation agent, followed by coupling with $\beta$-naphthol. Greater color yields and brighter shades of color were obtained with the aminobenzoic than with the aminobenzenephosphonic acid.

The free acids or the ammonium salts of the above compounds generally undergo further fixation than their sodium salts.

While other acids, such as hydrochloric acid or sulfamic acid, worked with p-aminobenzoic acid, it is preferred to use phosphoric acid, as somewhat better results were obtained.

Other carboxyl-containing dyes, which could be used in the above examples with somewhat similar results, include those having the following structure:

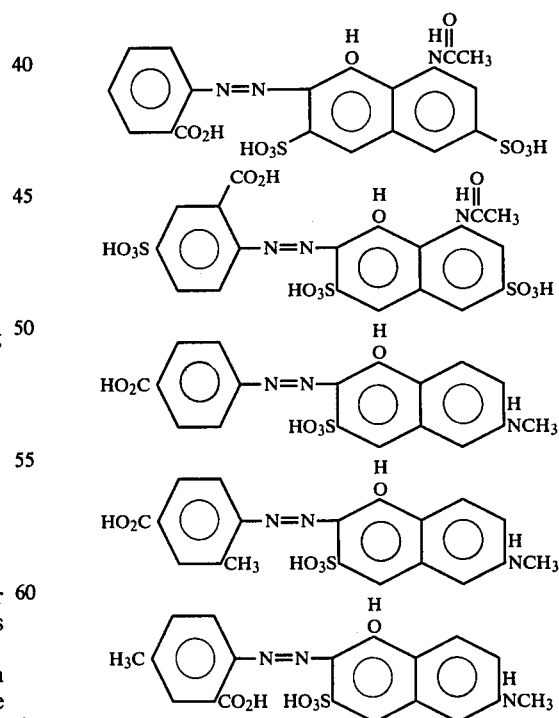

As mentioned hereinabove, it has been found that reactive dyes having the following group:

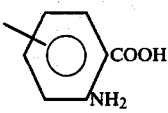

are more effective than similar compounds without the amino group, for coupling to cellulose. The dye will be of the formula

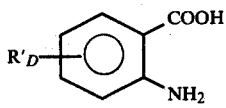

wherein $R'_D$ is the remaining part of a dye and may be singly or doubly (as in a naphthalene derivative) attached to the aminocarboxyphenyl ring. This is illustrated by the following working examples:

EXAMPLE 37

An aqueous dye solution was prepared from a dye having the formula:

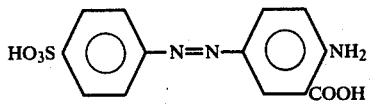

The dye was made as follows: 8.65 g. (0.05 mole) sulfanilic acid was dissolved in 25 cc 2 N Na$_2$CO$_3$ solution and diluted with an additional 25 cc water. To this solution was added 50 cc 1 N NaNO$_2$ and the total solution was then added to 62.5 cc 2 N HCl in 50 g. ice. The pH was adjusted to 3 with HCl and the mixture was stirred at 5°–10° C. for 20 minutes. The diazonium solution is then added slowly to a solution containing 5 g. o-aminobenzoic acid and 5.3 g Na$_2$CO$_3$. The yellow dye formed was precipitated with HCl. The dye bath contained 1.0% by weight of the above dye, 8% by volume of cyanamide (50% aqueous solution), 0.5 volume % of 85% H$_3$PO$_4$ and 0.25 volume percent Igepal CO-710. The dye solution was padded onto 100% cotton fabric to a pickup of 60–70 weight percent, dried at 220° F. and then cured for 90 seconds at 390° F. Washing with a nonionic detergent solution containing Na$_2$CO$_3$ resulted in a retention value of 33% of the dye on the fabric.

EXAMPLE 38

Example 37 was repeated, except the dye was replaced by the dye of the following formula:

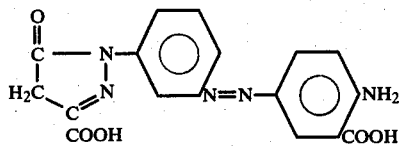

The dye was made as follows: 7.1 g (0.025 mole) 1-(m-aminophenyl)-3-carboxy-5-pyrazolone was dispersed in 50 ml water, neutralized with 5.3 g (0.05 mole) Na$_2$CO$_3$, and cooled to 15°–20° C. 1.9 g NaNO$_2$ (0.025 mole) dissolved in 10 ml water was then added. This solution was then poured slowly into a mixture of 13 ml conc. HCl (37%) and 40 g ice forming a fine dispersion. This fine dispersion was then added slowly to a solution containing 3.2 g (0.025 mole) o-aminobenzoic acid and 5 g. Na$_2$CO$_3$, and when the reaction was complete the brownish-yellow dye was precipitated with conc. HCl, filtered and dried. The retention value was 58%.

EXAMPLE 39

Example 37 was repeated, but this time the dye was replaced by the brownish-yellow dye of the formula:

The procedure of Example 38 was followed in making the dye, except that the diazonium solution was made from 4-amino-3'-carboxy-4'-hydroxyazobenzene. This example resulted in a retention value of 85%.

EXAMPLE 40

A mixture of 7.5 g (0.025 mole) bromaminic acid, 3.8 g (0.025 mole) 3,5-diaminobenzoic acid, 1 g cuprous chloride, and 175 ml water was stirred into a good dispersion in a flask equipped with a stirrer and condenser. 50 ml ethanol and 13.5 g Na$_2$CO$_3$ were added in portions at 45°–50° C. over 35–40 minutes, after which this temperature was maintained for 18 hours. The resulting anthraquinone dye was precipitated by pouring the mixture into 50 ml 37% HCl and recrystallized from 7% HCl. It had the formula

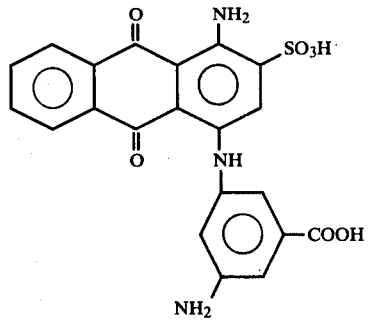

This dye was used in a bath containing
 0.5% dye
 0.5% H$_3$PO$_4$ (85%)
 0.5% Igepal CO-710
 4.0% cyanamide The pH was adjusted to 5 and the bath padded on cotton fabric at 20 psi. The fabric was dried 2 minutes at 220° F., cured for 90 seconds at 390° F., and scoured with 0.5 g/l Na$_2$CO$_3$ at 180° F. for 5 minutes. The color retention was 40%.

EXAMPLE 41

This experiment used fiberglass cloth sized with polyvinyl alcohol as the substrate. A dye of the following formula was used:

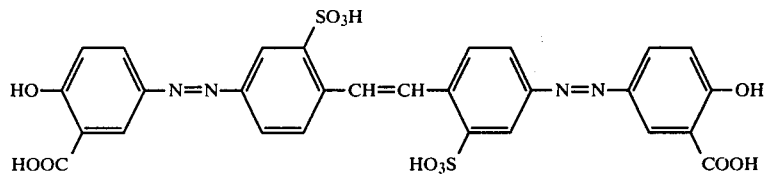

A. As a control an aqueous solution containing 0.5% of the above dye was prepared and padded on a swatch of fiberglass cloth sized with polyvinyl alcohol then dried and cured for 90 seconds at 215° C. (420° F.). No cyanamide compound was used.

B. Next an aqueous solution was prepared containing the following ingredients expressed in weight percent:
0.5% of the above dye
4.0% dicyandiamide
0.1% Igepal Co-710 (surfactant)
0.4% $H_3PO_4$
0.2% UCAR Z-212

The above dyebath was adjusted to a pH of 5.5 and padded onto a swatch of PVA-sized fiberglass, dried and cured for 90 seconds at 215° C. (420° F.) in the manner of the previous examples.

Both swatches were scoured with a detergent solution of 1.5 g/l Synthrapol SP and 1.5 g/l soda ash at the boil for 2 minutes. Color retention was then determined by measurement with a spectrophotometer. The results were as follows:

|  | retention (%) |
| --- | --- |
| swatch A (control) | 7.8 |
| swatch B | 55.0 |

These studies indicate that in the presence of the cyanamide compound the carboxylic dye reacts with the PVA on the fiberglass; there was no affinity for the PVA in the absence of the cyanamide-containing padding solution.

Ucar Z-212, a nonionic thickener made by Union Carbide Corp., is reported to be a mixture of 70% hydroxyethyl cellulose, molecular weight up to 10,000 and 30% polyethylene glycol, molecular weight 4000. Igepal CO-710 is nonylphenoxypoly(ethyleneoxy)ethanol surfactant. Synthrapol SP, sold by ICI America, Inc., used as a detergent and wetting agent, is a blend of nonionic and ionic surfactants.

The term "retention" as used herein means that percentage of the color remaining after one process rinse, the color of the fabric coming from the curing oven being taken as the base, i.e. 100%. The term "endurance" means the percentage of the base color remaining after the process rinse and five launderings, except where the number of launderings is noted to be otherwise. The color measurements are made on a Beckman DBG spectrophotometer.

What is claimed:

1. A method of forming a reactively dyed polymeric substrate, said method comprising
  (a) contacting a polyvinyl alcohol substrate at a pH of about 1.5 to about 11 with
    (i) a cyanamide compound selected from the group consisting of cyanamide, alkyl-substituted cyanamide, dicyandiamide and alkyl-substituted dicyandiamide, wherein said alkyl groups each contain from 1 to 6 carbon atoms, and with
    (ii) a coloring amount of an aromatic dye of the formula Dye-COOH, wherein Dye is an aromatic chromophore wherein the ratio of equivalents of said cyanamide compound to each carboxylic acid function of said aromatic dye is at least about 2:1, and
  (b) heating the contacted substrate to a temperature of at least 200° F. for a time sufficient to fix said chromophore to said substrate by condensation reaction between said active hydrogen and the —COOH group of said dye so as to join the chromophore to the substrate through the C atom of said —COOH group.

2. A composition for reactively dyeing textile substrates containing non-phenolic alcoholic substituents, said composition comprising an aqueous solution having a pH of from about 1.5 to about 11 and containing
  (a) at least 0.1% by weight of an aromatic dyestuff which is substituted by at least one carboxyl acid group which is reactive with active hydrogen atoms of said substituents so that the dyestuff can be joined to the substrate through the C atom of said —COOH group, and
  (b) a water soluble cyanamide compound selected from the group consisting of cyanamide, alkyl-substituted cyanamide, dicyandiamide and alkyl-substituted dicyandiamide, wherein the alkyl substituents contain from 1-6 carbon atoms, wherein the ratio equivalent of cyanamide compound to carboxylic acid is at least about 2:1.

3. Composition according to claim 2 wherein said dye has the formula

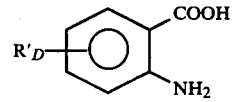

wherein $R'_D$ is the remaining part of a dye and is singly or doubly attached to the aminocarboxyphenyl ring.

4. A method of forming a reactively dyed polymeric substrate, said method comprising
  (a) contacting a polymeric substrate containing non-phenolic alcoholic active hydrogen atoms at a pH of about 1.5 to about 11 with
    (i) a cyanamide compound selected from the group consisting of cyanamide, alkyl-substituted cyanamide, dicyandiamide and alkyl-substituted dicyandiamide, wherein said alkyl groups each contain from 1 to 6 carbon atoms, and with
    (ii) a coloring amount of an aromatic dye of the formula Dye-COOH, wherein Dye is an aromatic chromophore wherein the ratio of equivalents of said cyanamide compound to each carboxylic acid function of said aromatic dye is at least about 2:1, and (b) heating the contacted substrate to a temperature of at least 200° F. for a time sufficient to fix said chromophore to said substrate by condensation reaction between said active hydrogen and the —COOH group of said dye so as to join the chromophore to the substrate through the C atom of said —COOH group.

5. Method according to claim 4, wherein said chromophore is an azo chromophore.

6. Method according to claim 4, wherein said chromophore is an anthraquinone chromophore.

7. Method according to claims 4, 5 or 6, wherein said chromophore is substituted with a plurality of carboxylic acid substituents.

8. Method according to claim 7, wherein said chromophore contains two carboxylic acid substituents.

9. Method according to claim 4, wherein said carboxylic group is directly attached to a ring carbon atom of a phenyl group, and an amino group is attached to an adjacent carbon atom of the phenyl ring.

10. Method according to claim 4, wherein the contacted substrate of step (a) is dried prior to heating in step (b).

11. Method according to claim 4, wherein said substrate is a textile substrate.

12. Method according to claim 4, wherein said textile substrate is an organic polymer containing a plurality of hydroxyl groups.

13. Method according to claim 4, wherein said polymer is polyvinyl alcohol.

14. Method according to claim 4, wherein said cyanamide compound is cyanamide.

15. Method according to claim 4, wherein said cyanamide compound is dicyandiamide.

16. Method according to claim 4, wherein said substrate is in fibrous form coated with polyvinyl alcohol.

17. Method according to claim 4, wherein the chromophore is selected from the group consisting of anthraquinone, phthalocyanine, azo, benzanthrone, naphthoquinone, triarylmethane and cyanine chromophores.

* * * * *